United States Patent [19]
Bond et al.

[11] 3,858,939
[45] Jan. 7, 1975

[54] SOLID WASTE COLLECTION AND RECOVERY SYSTEM

[75] Inventors: Ronald L. Bond, Valdosta; E. C. Daughdrill, Lake Park; Henry T. Brice, Valdosta, all of Ga.

[73] Assignee: Swacars, Inc., Valdosta, Ga.

[22] Filed: July 9, 1973

[21] Appl. No.: 377,752

[52] U.S. Cl............... 298/8 R, 214/501, 298/20 R
[51] Int. Cl............................................. B60p 1/14
[58] Field of Search......... 298/8 R, 12, 19 V, 20 R, 298/21 V, 22 F; 214/86 A, 501, 505 X; 280/407

[56] References Cited
UNITED STATES PATENTS

| | | | |
|---|---|---|---|
| 1,376,146 | 4/1921 | Kahn | 298/8 R |
| 1,650,249 | 11/1927 | Venable | 298/8 R |
| 3,152,704 | 10/1964 | Russell | 214/86 A |
| 3,231,120 | 1/1966 | Dempster | 214/516 |
| 3,322,396 | 5/1967 | Hubbard | 214/86 A |

FOREIGN PATENTS OR APPLICATIONS

| | | | |
|---|---|---|---|
| 574,099 | 3/1924 | France | 298/20 R |
| 2,939 | 8/1914 | Great Britain | 298/8 R |

*Primary Examiner*—Lloyd L. King
*Assistant Examiner*—Reinhard J. Eisenzopf
*Attorney, Agent, or Firm*—Jones, Thomas & Askew

[57] ABSTRACT

A solid waste collection and recovery system including a compartmentalized waste collection trailer and a vehicle for towing and dumping the trailer. The collection trailer, which is supported adjacent one end with wheels and which has a towing hitch connection at another end, is divided into a number of separate compartments. Each of the compartments of the collection trailer can be selectively emptied when the towing hitch end of the trailer is elevated relative to the other end. The towing and dumping vehicle has a hitch for selective connection with the towing hitch of the trailer, and the vehicle hitch is mounted on the towing vehicle to be selectively raised so that the vehicle can be elevated to a dumping position. A particular towing and dumping vehicle can be used to tow and dump a number of collection trailers.

6 Claims, 4 Drawing Figures

SOLID WASTE COLLECTION AND RECOVERY SYSTEM

This invention relates in general to a system for the collection and recovery of solid waste material, and in particular to a solid waste collection and recovery system including a collection trailer and a vehicle for towing and dumping the collection trailer.

The collection and disposition of waste materials is presenting a problem of increasing magnitude to those whose activities generate the waste materials and to the governmental or private organizations which are responsible for collecting and disposing of the waste material. The sheer magnitude of solid waste material which is generated by the operation of a typical business concern, for example, combined with the increasing emphasis on segregation of various types of waste material which can be recycled, imposes an increasing cost burden upon those who ultimately pay for waste collection and disposition services.

As a generalization, the trend in solid waste collection equipment has been toward the procurement and use of heavier, more expensive, more complex mechanized equipment. Such prior-art equipment typically involves the need for a number of truck-mounted trash compacting vehicles which compress the collected trash to a fraction of its initial volume. Trash may be manually inserted in the packing truck, or the trash may be initially collected in containers which are designed to be hoisted and dumped by special apparatus associated with the collection truck. The increasing sophistication and cost of such equipment provides an increasing burden on the budgets of small municipalities and companies which, practically speaking, have had no reasonable alternative to the purchase and operation of such equipment.

The trend toward increased complexity of waste collection equipment has resulted in an increasing amount of down-time for such equipment, resulting in part by the rugged treatment to which such complex equipment is necessarily subjected. Moreover, the maintenance and repair of such equipment requires the costly services of relatively skilled mechanics and technicians, and such services simply may not be relatively immediately available to many small municipalities and companies which operate waste collection equipment.

A further disadvantage of the conventional trash packing truck stems from the currently increasing desire that certain types of waste materials be maintained in segregation for possible reuse or recycling. Since the typical trash compactor is not readily adaptable to maintaining separate compartments for separate types of trash, such as metallic cans, glass bottles, and paper, to name only a few kinds of recyclable waste, collection and recovery of recyclable materials by conventional trash packing trucks would require the exorbitant expense of maintaining separate trucks and separate collection routes for each kind of recyclable waste, as well as for non-recyclable waste.

Accordingly, it is an object of the present invention to provide an improved system for the collection and recovery of solid waste.

It is another object of the present invention to provide a system for the segregated collection and selective disposition to disparate types of solid waste material.

It is still another object of the present invention to provide a solid waste collection system having components which are relatively inexpensive to acquire, maintain, and operate.

Other objects and many attendant advantages of the present invention will become apparent from the following discussion of a disclosed embodiment, including the drawings in which.

Stated in general terms, the solid waste collection and recovery system of the present invention includes a towable vehicle having a material receiving volume divided into a number of separate compartments, and a vehicle for towing the towable vehicle and for selectively placing the towable vehicle in position for removal of waste contained therein. The waste collection vehicle is divided into compartments by transversely extending members which are maintained in place during the collection of waste and the subsequent transportation of the collection trailer to a waste disposition location. After the first one of the dividing members has been appropriately manipulated, the towing vehicle places the collection trailer in an elevated position so that the waste material stored in a first compartment is emptied by gravity. Subsequent disconnection of the other dividing members permits the contents of the other collection compartments to be selectively individually emptied at desired locations and times.

Figure 1:
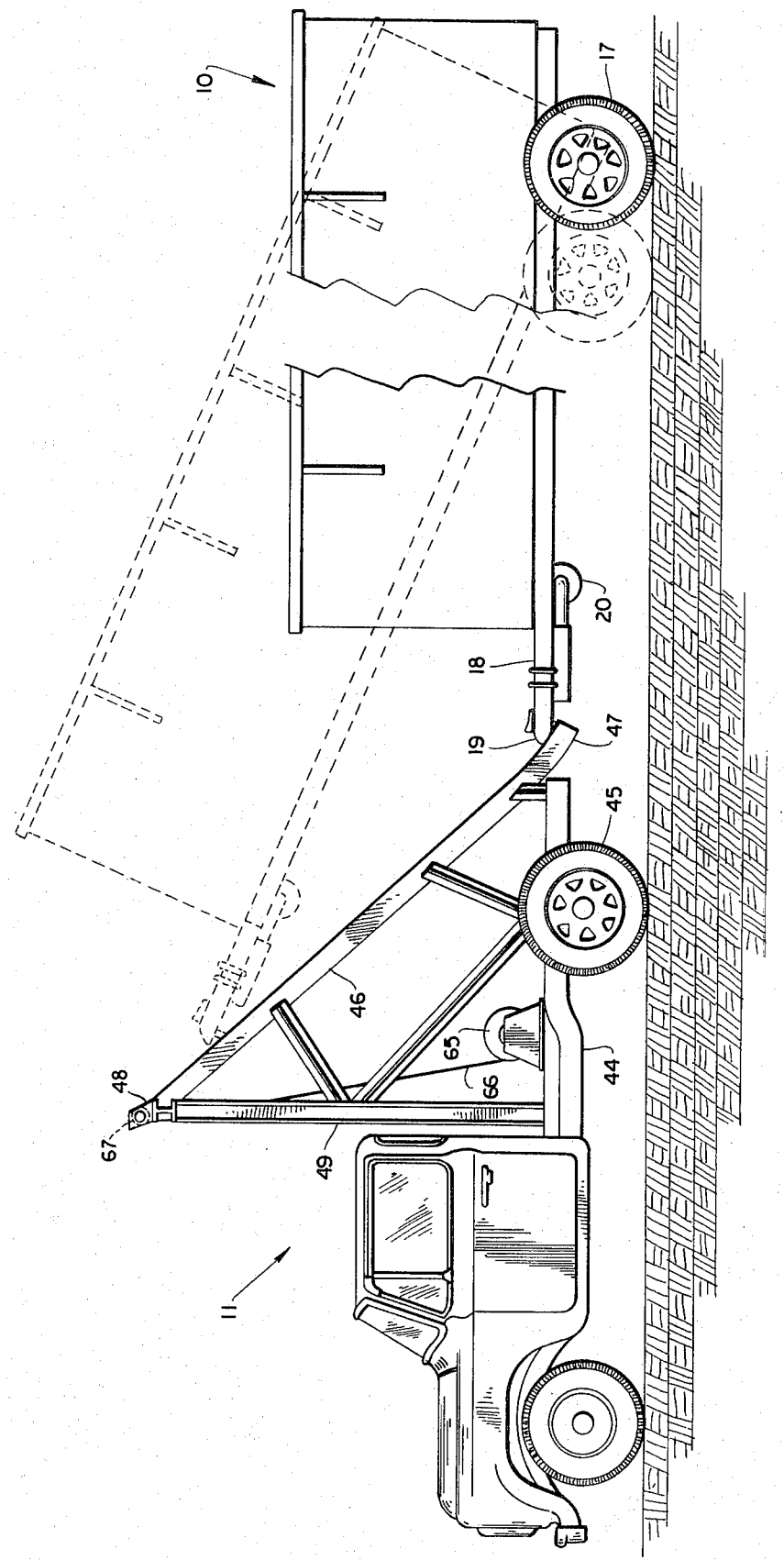
FIG. 1 shows a plan view of a waste collection and recovery system according to the disclosed embodiment of the present invention.
Figure 2:
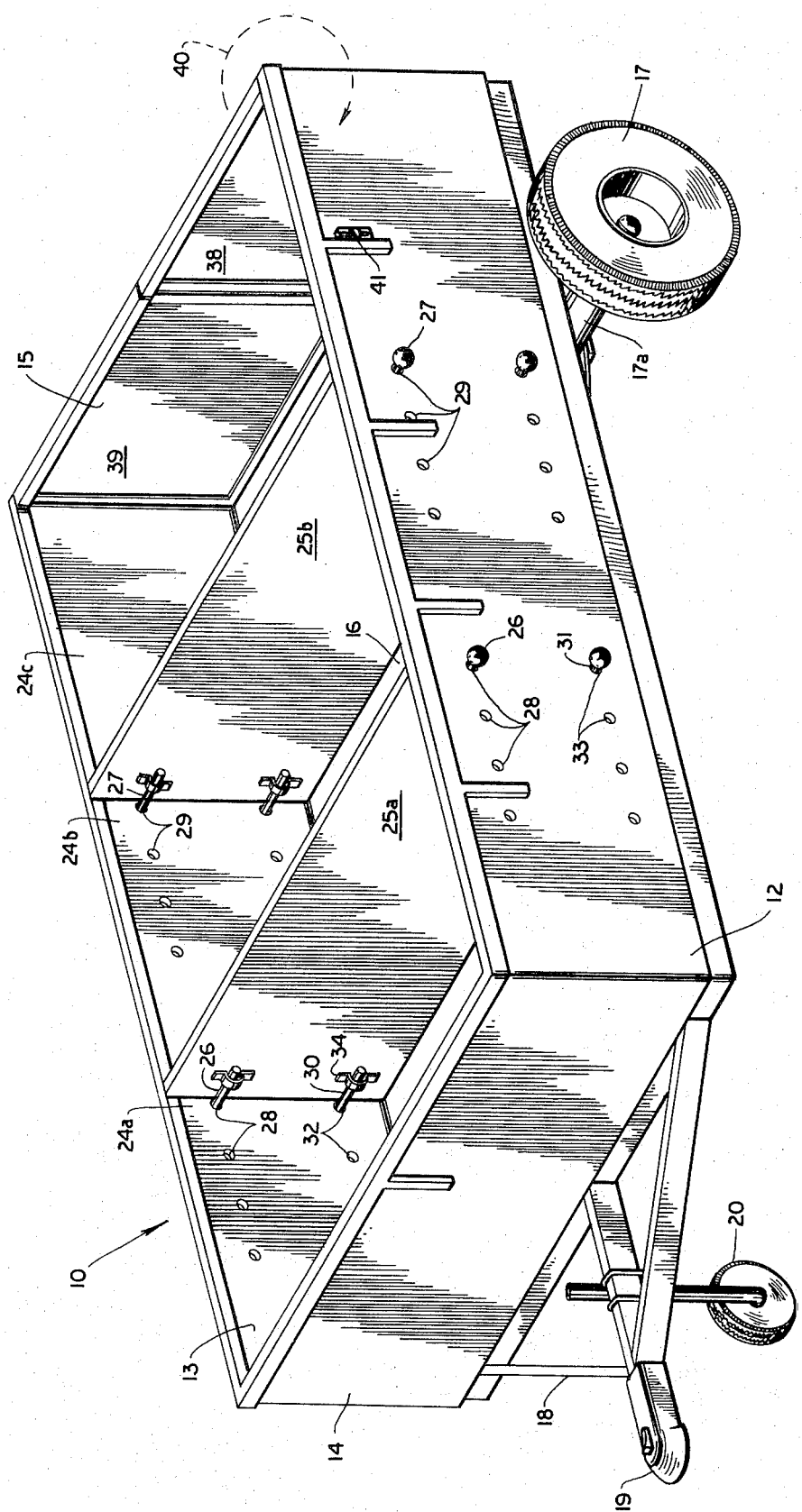
FIG. 2 shows an isometric view of a waste collection trailer according to the disclosed embodiment.

The present invention is more particularly shown and understood with respect to the disclosed embodiment, whereat in FIG. 1 is shown a waste collection system including a collection trailer indicated generally at 10 and a vehicle indicated generally at 11 for towing and dumping the collection trailer. The collection trailer 10, as particularly depicted in FIG. 2, has a material receiving volume defined overall by a pair of side members 12 and 13, by a front member 14, and by a rear gate 15. The side members 12 and 13, the front member 14, and the rear gate 15 all extend upwardly from a floor 16. The trailer 10 includes at least one pair of wheels, one of which is shown at 17, rotatably mounted on an axle 17a positioned toward the rear end of the vehicle. A towing hitch 18 extends outwardly from the front end of the collection trailer 10 and has a socket 19 for selective connection to the towing vehicle 11. A support device such as the retractable wheel 20 may be attached to the hitch 18 for supporting the trailer in the substantially level configuration when disconnected from a towing vehicle, as shown in FIG. 2.

The interior volume of the collection trailer 10 is divided into a number of separate compartments 24a, 24b, 24c. The adjacent compartments within the trailer are separated from each other by partition members 25a and 25b, and by the rear gate 15. Each of the partitions 25a and 25b is pivotally connected between the side members 12 and 13, with the pivotal mounting of the partition 25a being provided by a pair of pivot members (one of which is shown at 26 for the partition 25a, and at 27 for the partition 25b) connected to the partitions and extending into corresponding receptacles 28, 29. Each of the receptacles 28, 29 may simply be provided by apertures in the corresponding sides of the collection trailer, and the pivot members 26 and 27 may be provided by rods which are secured to the partition 25a and which are loosely received within the apertures for pivotal movement. A number of longitudinally spaced-apart apertures 28 and 29 may be provided along the respective sides 13 and 12, to enable the longitudinal position of the partition 25a to be changed so that the volume of the first compartment 24a can be correspondingly changed.

The partition 25a is normally latched in place to prevent unwanted pivotal movement about the pivot members 26. Latching is accomplished in the disclosed embodiment with a pair of locking members 30, 31 which are insertable through ones of corresponding series of apertures 32 and 33 disposed in the side members 13 and 12. Each of the latching members 30 and 31 preferably is insertable through a corresponding aperture 32 and 33, from without the collection trailer, for engagement within an appropriate member such as the hasp 34 or the like. Each of the locking members 30 and 31 may be permanently attached to the collection trailer by way of a chain or any other suitable device.

It will be understood that the partition 25b, as well as any additional partitions which are present in a waste collection trailer divided into more than three separate compartments, will be similarly provided with pivot members and latching members in the same manner as with the partition 25a.

The rear gate 15 may similarly be a swing-up gate of the type exemplified by the partitions 25a and 25b. Alternatively, the rear gate 15 may be provided by a pair of so-called barn doors 38 and 39 each of which is hinged at the rear of the respective side member 12 and 13 to be swung outwardly along a path indicated by the broken line 40 (in the case of the door 38) and secured to the respective side member by an appropriate latching device 40 immediately prior to dumping. The two barn doors 38 and 39 can be latched in the closed position, shown in FIG. 2, by any suitable device which securely retains the two doors in closed position.

Although the collection trailer 10 is depicted in FIG. 2 as having an open top for clarity of illustration, it will be understood that this trailer may be covered with a suitable top having selectively openable apertures for inserting waste material so that the material does not become saturated with rain.

Turning to the vehicle 11 used for towing and dumping the collection trailer 10, the vehicle as depicted in FIG. 1 includes a chassis 44 having at least one rear axle mounting wheels 45. Attached to the chassis 44 is a rail assembly 46 supported on and by the chassis and extending from a lowermost end 47 to an uppermost end 48. The uppermost end 48 of the rail assembly 46 is supported by upright supports 49, which may be in the shape of an A-frame as viewed from the rear of the vehicle 11 to provide lateral support to the rail assembly. Other support and bracing members may be employed to provide adequate structural support for the rail assembly.

Figure 4:
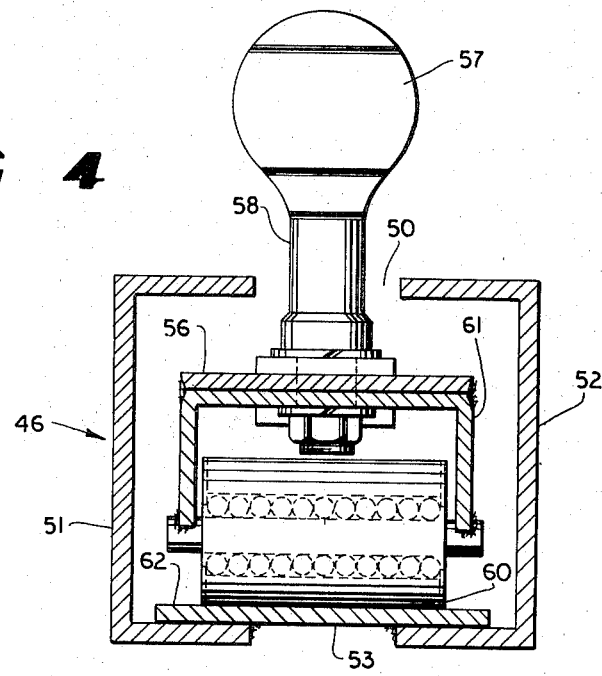
FIG. 4 shows a section view taken along line 4—4 of FIG. 3.

The rail assembly 46, as best seen in FIG. 4, is in the shape of a box beam assembly having approximately a C-shaped cross-section with the open part of the C-section facing upwardly to provide an elongate slot 50 extending along the full length of the rail assembly from the lowermost end 47 to the uppermost end 48. The rail assembly can be fabricated from two separate spaced-apart channel members 51 and 52 joined together at the underside by a plate 53.

Received within the channel formed by the rail assembly 46 is a hitch carrier 56 onto which is mounted a hitch member consisting, in the disclosed embodiment, of a ball 57 on a stem member 58 extending through the slot 50 at an appropriate angle, relative to the diagonal pitch of the rail assembly 46, which places the ball stem member 58 and the ball 57 in proximately vertical alignment as viewed in FIG. 1. It will be understood by those skilled in the art that the ball 57 is for mating engagement with the socket 19 of the collection trailer 10, and that alternative selectively connectable elements may be substituted for the aforementioned ball-and-socket interconnection.

Figure 3:
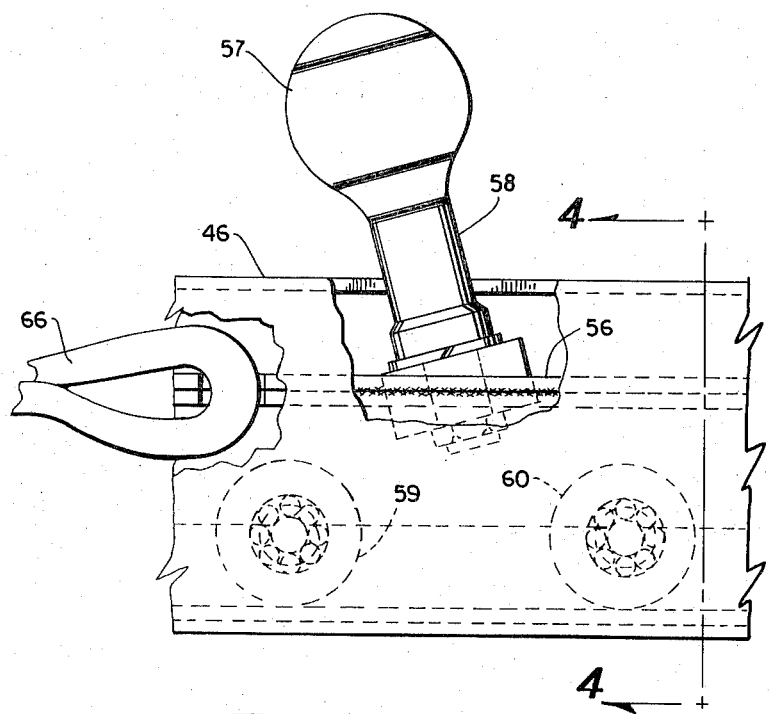
FIG. 3 shows a side section view of a portion of the hitch rail assembly on the towing vehicle.

The hitch support 56 includes a pair of ball-bearing mounted rollers 59 and 60 mounted for rotation about corresponding axles which are secured on side members downwardly depending from the cross member 61 to which the stem member 58 is attached. It can be seen from FIGS. 3 and 4 that the rollers 59 and 60 support the hitch support 56, as well as any load received by the ball 57, for support and for movement along the bottom 62 of the rail assembly 46.

A winch mechanism 65 is mounted to the chassis 44 of the vehicle 11 and has a cable 66 extending upwardly and around a pulley 67 positioned adjacent the uppermost end 48 of the rail assembly, and thence downwardly within the channel member 51 for connection to the hitch support 56. The winch 65 may be driven by a conventional power-takeoff interconnection with the engine of the vehicle 11, or may alternatively be driven by an electric motor or another suitable motive device. The details of our sources and operating controls for winch mechanisms are known to those skilled in the art.

Considering the operation of the above-described embodiment of the present invention, it is assumed that one or more waste collection trailers 10 would be suitably disposed near business, industrial, commercial, or other enterprises expected to generate several kinds of waste materials. The people responsible for dumping the waste material would be instructed to place various types of materials within different compartments of the collection trailer 10. For example, separate compartments could be designated to receive materials such as glass bottles, recyclable waste paper, ferrous metal, and so on. When one or more of the compartments of the collection trailer is filled, or alternatively at regular collection schedules, the towing and dumping vehicle 11 is coupled to one of the waste collection trailers 10 and the trailer is towed to a dumping location. The towing operation occurs with the hitch support assembly 56 at the lowermost end 47 of the rail assembly 46, as depicted at solid line in FIG. 1. The rearward force applied to the ball 57 during towing is applied to the rail assembly 46 by contact between the hitch support 56 and the interior of the rail assembly.

When the dumping location is reached, the rear end of the trailer 10 is positioned at a location to receive the particular waste material in the rearward compartment 24c. The rear gate 15 is opened, and power is applied to the winch assembly 65 to reel in the cable 66 and move the hitch support 56 upwardly along the rail assembly until the hitch support is positioned approximately at the uppermost end 48. The dimensions of the collection trailer, and in particular the distance between the towing hitch 18 and the wheels 17 thereof, preferably are selected in combination with the maximum elevation provided by the uppermost end 48 of the rail assembly 46, so that the floor 16 of the collection trailer is now positioned at an angle which readily causes the waste material received within the compartment 24c to slide out of that compartment through the opened rear gate 15. The dumping position of the collection trailer is shown in broken line in FIG. 1. An angle of trailer elevation of approximately 300° is appropriate, although that particular angle is not intended to limit.

As soon as the rearward compartment 24c has been dumped, the collection trailer 10 is repositioned at another location designated to receive the type of waste material disposed in the next compartment 24b. The rear gate 15 remains open, and the locking members 30 and 31 associated with the partition 25b are withdrawn so that the partition is freely pivotable about the pivot members 26 and 27. The hitch support 56 is once again elevated by the winch assembly 65, and the waste material received within the compartment 24b slides along the floor 16 of the trailer toward the rear end of the trailer and exits through the open rear gate 15. The lower end of the partition 25b swings upwardly at this time, relative to the elevated floor, to permit the aforementioned sliding exit of the waste material formerly in the compartment 24b. The winch assembly 65 is then operated to lower the trailer to a towing position.

The foregoing dumping assembly is repeated as often as necessary to empty each compartment of the collection trailer at a collection point which is appropriate for the particular waste material in each compartment. It will be understood that a central dumping location may be provided having a number of separate areas designated to receive the various kinds of waste material within the collection trailer. Alternatively, it will be understood that the collection trailers may be towed to widely separated locations to dump particular kinds of waste material. For example, waste paper products could be dumped at a factory which reclaims the paper, while metallic beverage cans, for example, could be dumped at a separate location containing equipment to separate ferrous and non-ferrous cans and to compact the cans for shipment.

It will be understood that a number of collection trailers 10 can be serviced by a relatively smaller number of towing and dumping vehicles 11. Although the above-described example of operation employs the stationery positioning of collection trailers adjacent locations which generate volumes of waste material, it is within the scope of the present invention to utilize a collection trailer-towing vehicle combination for municipal roving trash collection service, for example, where the trash or waste material is segregated according to particular types of materials. It will be seen that both the collection trailer and the towing and dumping Vehicle do not require sophisticated and complex operating or control machinery, and can be constructed at a fraction of the cost associated with modern waste collection equipment of the compactor type, for example.

It will also be understood that the foregoing relates only to a preferred embodiment of the present invention, and that numerous alterations and modifications may be made therein without departing from the spirit and the scope of the invention as set forth in the following claims.

What is claimed is:

1. In a towing vehicle for towing a trailing vehicle, said towing vehicle having a rear axle, a track mounted over said rear axle and extending from a lower elevation to an upper elevation with respect to said rear axle, a hitch member mounted for movement along said track and operative for towing interconnection with a trailing vehicle, motive means connected to said hitch member for selectively moving the hitch member along said track between said lower and upper elevations, wherein said track including a lower support surface along which said hitch member is movably received for load bearing support, and a rearward support mounted in rearward confronting relation with said hitch member to receive trailing forces imparted to the hitch member by a connected trailing vehice, said track additionally comprising an elongate channel having a floor for said lower support surface and a wall in spaced apart relation from said floor, an elongate slot extending the length of said wall, said hitch member having a bearing portion captivated for reciprocable travel within said channel and a hitch portion connected to said bearing portion and extending through said slot to a location outside of said channel for said towing interconnection, said wall comprising said rearward support for said bearing portion, said elongate channel being mounted on said towing vehicle extending diagonally from said lower elevation at a point located behind said rear axle to said upper elevation at a point located in front of said rear axle, said bearing portion of said hitch member including at least one roller for rolling traverse along said floor, a roller carrier having a pair of side members extending from alongside said roller to a position spaced above said roller, a support joined with said side members and extending above said roller and spaced apart from said elongate slot within said elongate channel, and said hitch portion including a member connected to said support and extending through and without said elongate slot for unimpaired movement therealong in response to movement of said bearing portion.

2. Apparatus as in claim 1, wherein said hitch member includes a hitch ball for selective interconnection with a corresponding hitch socket of a trailing vehicle, and said member extends through said elongate slot at substantially vertical alignment.

3. Apparatus as in claim 1, wherein said motive means includes a winch mounted on said towing vehicle, a pulley mounted adjacent the upper elevation of said elongate channel, a length of cable extending in winding relation from said winch and around said pulley and disposed downwardly along and within said elongate channel and connected to said bearing portion.

4. In a towing vehicle for towing a trailing vehicle, said towing vehicle having a rear axle, a track mounted over said rear axle and extending from a lower elevation to an upper elevation with respect to said rear axle, a hitch member mounted for movement along said track and operative for towing interconnection with a trailing vehicle, motive means connected to said hitch member for selectively moving the hitch member along said track between said lower and upper elevations, said track including a lower support surface along which said hitch member is movably received for load bearing support, and a rearward support mounted in rearward confronting relation with said hitch member to receive trailing forces imparted to the hitch member by a connected trailing vehicle, said track comprising an elongate channel having a floor providing a lower support surface along which said hitch member is movably received for load bearing support, and a wall in spaced apart relation from said floor, an elongate slot extending the length of said wall, said hitch member having a bearing portion captivated for reciprocable travel within said channel and a hitch portion connected to said bearing portion and extending through said slot to a location outside of said channel for said towing interconnection, said wall comprising a rearward support for said bearing portion to receive trailing forces imparted to the hitch member by a connected trailing vehicle, and the motive means connection includes a cable connected to said hitch member and extending within said elongate channel upwardly to said upper elevation.

5. Apparatus as in claim 4, wherein said elongate channel is mounted on said towing vehicle extending diagonally from said lower elevation at a point located behind said rear axle to said upper elevation at a point located in front of said rear axle.

6. Waste collection and recovery system, comprising:
a towable collection vehicle having plural separate material receiving compartments;
apparatus for towing said collection vehicle and selectively dumping material in said compartments;
said collection vehicle including a material receiving box mounted on a wheel assembly adjacent a rear end for towing;
said box having a floor and defined at the rear end by first means which closes said rear end and which is selectively openable to permit material to move out of said box;
at least one partition mounted within said box and extending across the width of the box to divide the box into two separate compartments one of which is closed by said first means and the other of which is contiguous to said one compartment;
means adjustably mounting said partition in the interior of said box at any of several locations spaced apart along the length of the box to enable said partition to move away from said floor in response to urging by material contained in said other compartment;
connecting means operatively engaging said partition to prevent said movement away from said floor and selectively operative to release said partition for said movement;
said collection vehicle having hitch means mounted a front thereof;
said towing apparatus having a hitch member selectively disconnectably attached to said hitch means; and
a track on which said hitch member is received for load bearing support, said track extending from a lower elevation to an upper elevation;
means selectively removably supporting said hitch member for selective movement along said track;
means mounting said track in a path substantially normal to the width of said collection vehicle; and
motive means connected to said hitch member for selectively moving said hitch member along said track between said lower and upper elevations.

* * * * *